United States Patent
Weakland

(10) Patent No.: US 10,843,532 B2
(45) Date of Patent: Nov. 24, 2020

(54) PORTABLE WINDSHIELD INSTALLATION DEVICE

(71) Applicant: James Weakland, Rialto, CA (US)

(72) Inventor: James Weakland, Rialto, CA (US)

(73) Assignee: James Weakland, Rialto, CA (US)

(*) Notice: Subject to any disclaimer, the term of this patent is extended or adjusted under 35 U.S.C. 154(b) by 185 days.

(21) Appl. No.: 15/678,906

(22) Filed: Aug. 16, 2017

(65) Prior Publication Data
US 2019/0054805 A1    Feb. 21, 2019

(51) Int. Cl.
| | |
|---|---|
| *B60J 1/00* | (2006.01) |
| *B25B 11/00* | (2006.01) |
| *B66C 23/02* | (2006.01) |
| *B66C 13/44* | (2006.01) |
| *B62D 65/02* | (2006.01) |
| *B62D 65/06* | (2006.01) |

(52) U.S. Cl.
CPC ............ *B60J 1/005* (2013.01); *B25B 11/007* (2013.01); *B62D 65/024* (2013.01); *B62D 65/026* (2013.01); *B62D 65/06* (2013.01); *B66C 13/44* (2013.01); *B66C 23/022* (2013.01)

(58) Field of Classification Search
CPC ......... B60J 1/004; B60J 1/005; B25B 11/007; B62D 65/026; B62D 65/06; B66C 23/022; B66C 23/48; B66C 23/485
USPC ..... 29/281.5; 254/8 B, 4 C, 4 B, 4 R, 45, 47
See application file for complete search history.

(56) References Cited

U.S. PATENT DOCUMENTS

| | | | |
|---|---|---|---|
| 2,974,809 A * | 3/1961 | Sellars ............... | B66C 23/48 212/203 |
| 3,599,812 A * | 8/1971 | Hasstedt ............ | B66C 23/48 414/563 |
| 3,671,015 A * | 6/1972 | Sullivan ............. | B66C 23/205 254/332 |
| 3,931,956 A * | 1/1976 | Hawkins ............ | B66C 23/48 254/8 B |
| 5,416,965 A | 5/1995 | Mayhugh | |
| 5,505,578 A * | 4/1996 | Fuller ................. | B60B 29/002 414/427 |
| 5,800,000 A * | 9/1998 | Shockley ........... | B66C 1/107 294/67.5 |
| 5,934,490 A * | 8/1999 | Mora .................. | B25H 1/0007 212/176 |
| 7,039,995 B2 | 5/2006 | Thompson | |
| 8,650,733 B2 | 2/2014 | Daigle, Sr. et al. | |
| 10,287,140 B2 * | 5/2019 | Grodaes ............ | B66C 23/485 |
| 2003/0057408 A1* | 3/2003 | Kazerooni ......... | B66D 3/18 254/270 |
| 2003/0098559 A1* | 5/2003 | Reese ................ | B25H 5/00 280/32.6 |

(Continued)

FOREIGN PATENT DOCUMENTS

EP        1849634 B1    12/2008
WO    2016101018 A1     6/2016

*Primary Examiner* — Lee D Wilson
*Assistant Examiner* — Seahee Hong
(74) *Attorney, Agent, or Firm* — Benjamin Diederich

(57) ABSTRACT

A portable apparatus, and methods to operate the apparatus, comprising a base that securely engages with a tire, a motor support structure, an electric motor coupled to an electrical power source, a pulley system, one or more attachment devices, and an electrical motor control device utilized to raise and lower a windshield (or other component) from a vehicle.

14 Claims, 9 Drawing Sheets

(56) References Cited

U.S. PATENT DOCUMENTS

| | | | |
|---|---|---|---|
| 2006/0208240 A1* | 9/2006 | Spittle | B66C 23/48 254/8 B |
| 2007/0069190 A1* | 3/2007 | Metcalf | B66C 23/48 254/8 B |
| 2015/0360737 A1 | 12/2015 | Brummett et al. | |

* cited by examiner

PORTABLE WINDSHIELD INSTALLATION DEVICE

BACKGROUND

Windshields and similar objects are easily broken and are difficult to replace by one person. Conventional windshield replacement systems may place the load of the windshield on a side window, utilize a large scaffolding system, or requires a vehicle to be driven onto the device. These systems risk further damage to a vehicle due to placing stress on vehicle parts typically not designed to be load bearing, cost increased time to perform setup, require additional users to perform the replacement, or require the user to operate the vehicle.

BRIEF SUMMARY

The present apparatus is a portable unit that uses the vehicle to anchor the pulley system. One piece of the apparatus sits under the vehicle's tire with one leg sliding under the rear of the tire and another sliding into the first leg portion and sitting under the front of the tire. The pulley system is then held in place by the weight of the vehicle on the tire on two contact points without adding any strain to any other component of the vehicle. An upper portion, comprising the motor, extending arm, and pulley components, is slid onto a lower portion. The motor may be mounted on a vertical (when deployed) member of the upper portion, or more preferably, on a horizontal (i.e., 'boom' member) of the upper portion, thus simplifying or eliminating the pulley system.

A suction cup is applied to one side of the windshield and attached to the pulley system via a hook. On the opposite side of the windshield, one or more suction cups with hand controls are attached. The user controls the windshield from the suction cup(s), which may have controls to the motor integrated. Utilizing the controls, the user is able to raise and lower the windshield and place the windshield on the vehicle with no other assistance. The arm (boom) component may swing from side to side (rotate about an axis defined by the vertical member) and move in and out (lengthen and shorten), to allow for proper placement of the windshield.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
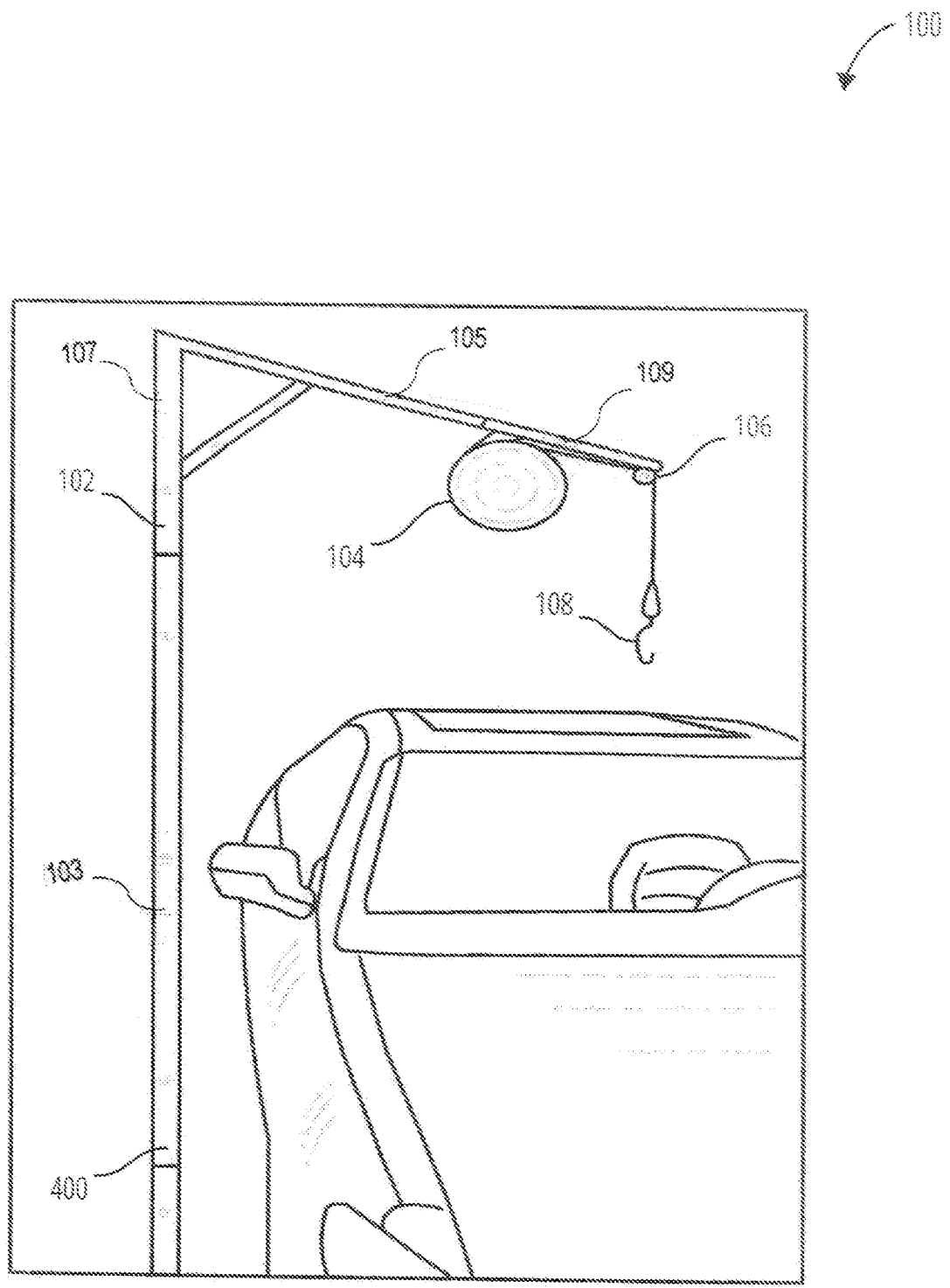
FIG. 1 illustrates an embodiment of upper portions windshield installation apparatus 100, in an example deployment before engaging the windshield to remove.

Referring to FIG. 1, an embodiment of upper portions of a windshield installation apparatus 100 comprises a base 400, a motor support structure 102, an electric motor 104, a pulley system 106, and a pulley system attachment device 108. Although referred to throughout as a 'windshield installation apparatus', the devices, systems, and methods herein may be used both for removal and installation of windshields. The base 400 is further described in conjunction with FIGS. 4 and 5. The base 400 couples to the motor support structure 102. The coupling may occur between the vertical base section of the base and the vertical motor support structure of the motor support structure 102. The base 400 may comprise an internal nylon sleeve, which allows the motor support structure 102 to pivot relative to the base 400. In another embodiment, the motor support structure 102 comprises the internal nylon sleeve. The base 400 and the motor support structure 102 may be coupled such that they may rotate with respect to each other and may also include a locking mechanism that may fix the relative position of the base 400 and the motor support structure 102. The locking mechanism may be a fastener as known in the art, for example a spring-loaded pin or a clamp.

The motor support structure 102 couples to the base 400, the electric motor 104, and the pulley system 106. The motor support structure 102 may include the vertical motor support structure 103, which may be vertically aligned portion with respect to the plane and the horizontal motor support structure 105, which may be at a third angle to the vertical motor support structure 103, resulting in being horizontally aligned to the plane (here, vertical and horizon are relative to the surface upon which the base 400 rests).

The motor support structure 102 may also include additional one or more vertical attachments 107 (e.g., vertical extension bars) to increase the height at which the pulley system 106 may be located relative to the surface at which the base 400 contacts. The motor support structure 102 may include a height adjustment mechanism, which may be a knob and pin inserted through holes in the motor support structure 102. The horizontal motor support structure (boom) of the motor support structure 102 may be extensible and lock with pin, clamp, or other known mechanisms (e.g., utilizing a horizontal motor support structure extension 109). The motor support structure 102 may be coupled to the electric motor 104 at either the vertical motor support structure 103 or the horizontal motor support structure 105 (depicted in FIG. 1).

In embodiments comprising the electric motor 104 coupled to the motor support structure 102 on the vertical motor support structure 103, the vertical motor support structure 103 of the motor support structure 102 may be coupled to part of the pulley system 106. As depicted in FIG. 1, the motor support structure 102 is coupled to the electric motor 104 on the horizontal motor support structure 105. As such, the pulley system 106 is simplified, and coupled only to the horizontal motor support structure 105 of the motor support structure 102.

The electric motor 104 is coupled to the motor support structure 102 and the pulley system 106. The electric motor 104 may be coupled with fasteners to enable altering the position of the electric motor 104 on the motor support structure 102. The electric motor 104 may be electrically coupled to an electrical power source, such as a direct current (DC) source (e.g., battery) or an alternating current (AC) source. The electric motor 104 may be operated with a wireless or wired remote control. The electric motor 104, when operated, may produce circular motion, which is translated into movement of the pulley system attachment device 108 via the pulley system 106.

The pulley system 106 may be coupled to the pulley system attachment device 108. The pulley system 106 may comprise a flexible cable directed via one or more force directing devices. The cable may be wound and unwound around the electric motor 104 based on the operation of the electric motor 104. The one or more force directing devices alter the direction of the movement of the cable when moved by the operation of the electric motor 104 or when a load is place on the cable via the pulley system attachment device 108, such as a windshield.

The pulley system attachment device 108 may be coupled to the pulley system 106. The pulley system attachment device 108 may be configured to further couple to one or more attachment devices. The apparatus 100 may be operated in accordance with the methods described in FIG. 7 and FIG. 8.

Figure 2:
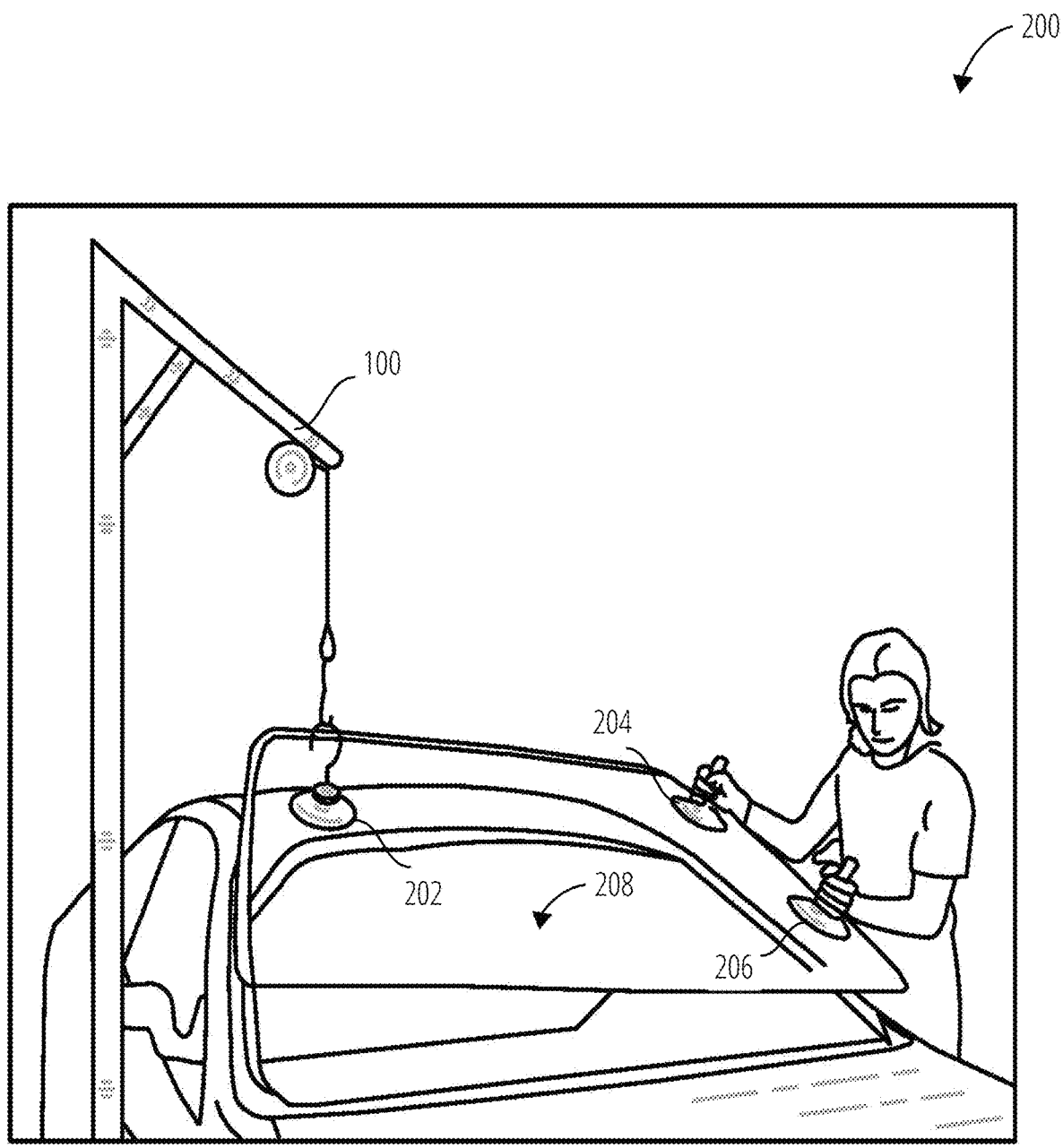
FIG. 2 further illustrates an embodiment of the windshield installation apparatus 100, and an installation control system 200, in an example deployment after removing the windshield.

Referring to FIG. 2, an installation system 200 comprises the apparatus 100, an attachment device 202, an attachment device 204, an attachment device 206, and a windshield 208.

The attachment device 202, the attachment device 204, and the attachment device 206 are coupled to the windshield 208. Of course, fewer attachment devices may be used for smaller windshields. The coupling may be via a suction cup device. One or both of the attachment device 204 and the attachment device 206 may comprise an electrical motor control device. A user may operate the electrical motor control device while handling one or both of the attachment device 204 and the attachment device 206. The electrical motor control device may operate wired or wirelessly with the apparatus 100 to raise or lower the windshield 208. Bluetooth or other handheld controls may be utilized to send a control signal from the electrical motor control device to the electric motor of the apparatus 100.

One or both of the attachment device 204 and the attachment device 206 may be utilized by the user to provide stability to the windshield 208 while being raised/lowered, while the attachment device 202 bears much of the load of the windshield 208. The electrical motor control device may in some embodiments be a cellular phone, with an application that permits the user set to operate the apparatus 100. The application may include a user interface that receives inputs from a user, including raise, lower, set a lower stop position for how far the apparatus 100 may lower the windshield 208 coupled to the apparatus 100 via the attachment device 202, set a upper stop position for how far the apparatus 100 may raise the windshield 208 coupled to the apparatus 100 via the pulley system attachment device 108, etc.

Figure 7:
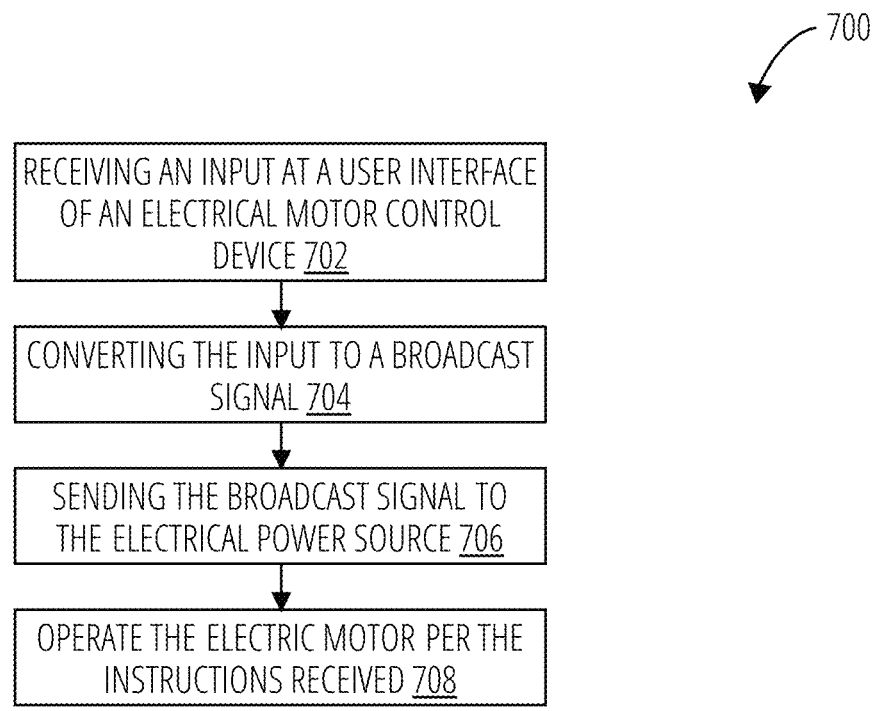
FIG. 7 illustrates an embodiment of an operating method 700 of the windshield installation apparatus 100.
Figure 8:
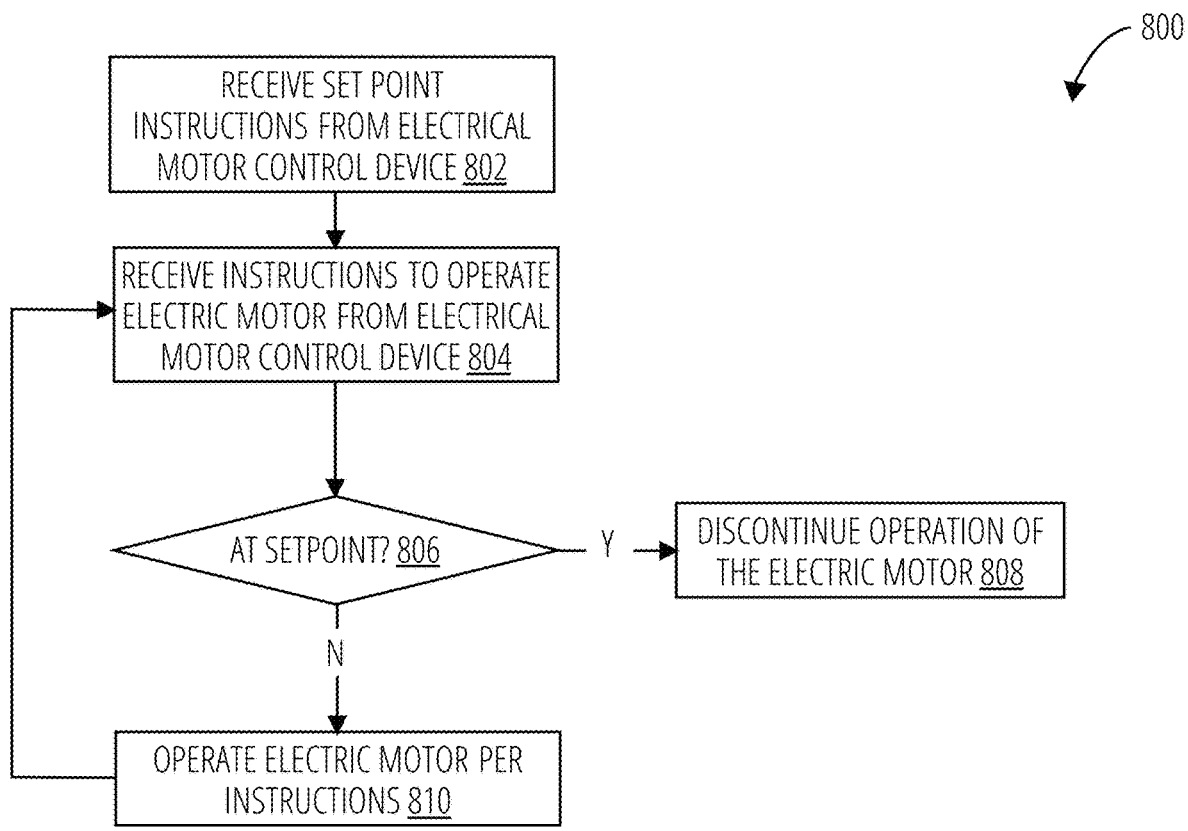
FIG. 8 further illustrates an embodiment of an operating method 800 of the windshield installation apparatus 100.

As noted prior, the system 200 may be operated in accordance with the processes described in FIG. 7 and FIG. 8.

Figure 3:
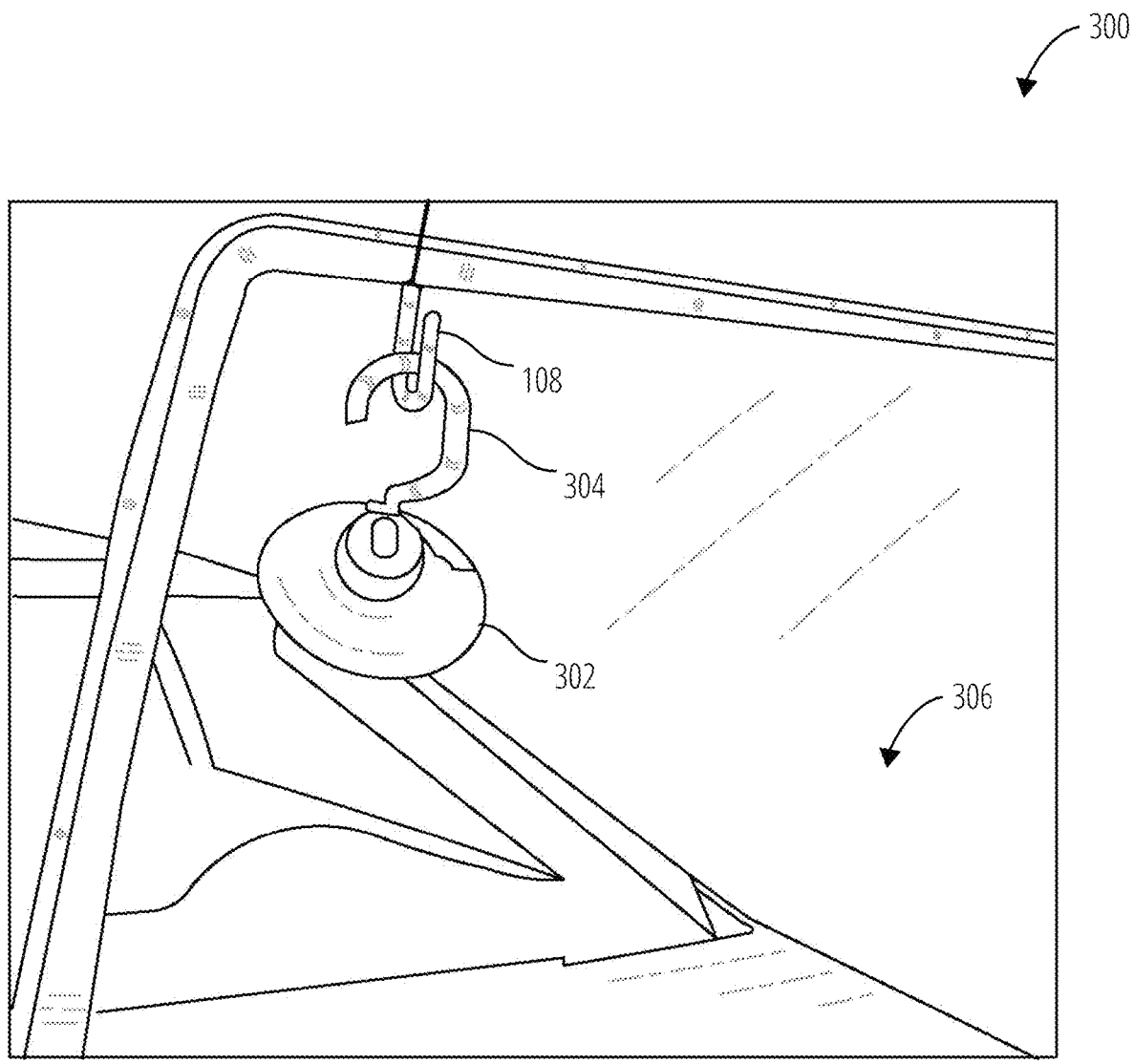
FIG. 3 illustrates an embodiment of an attachment device 300 for the windshield installation apparatus 100.

Referring to FIG. 3, the attachment device 300 comprises a pulley system attachment device 108, a suction cup 302, a suction attaching device 304, and a windshield 306. The suction cup 302 is coupled to the windshield 306 utilizing vacuum pressure to adhere to the windshield 306. The suction cup 302 may be coupled to an attachment device 304 to further couple to a pulley system attachment device 108. The force generated by the electric motor is thus transferred to the windshield 306.

Figure 4:
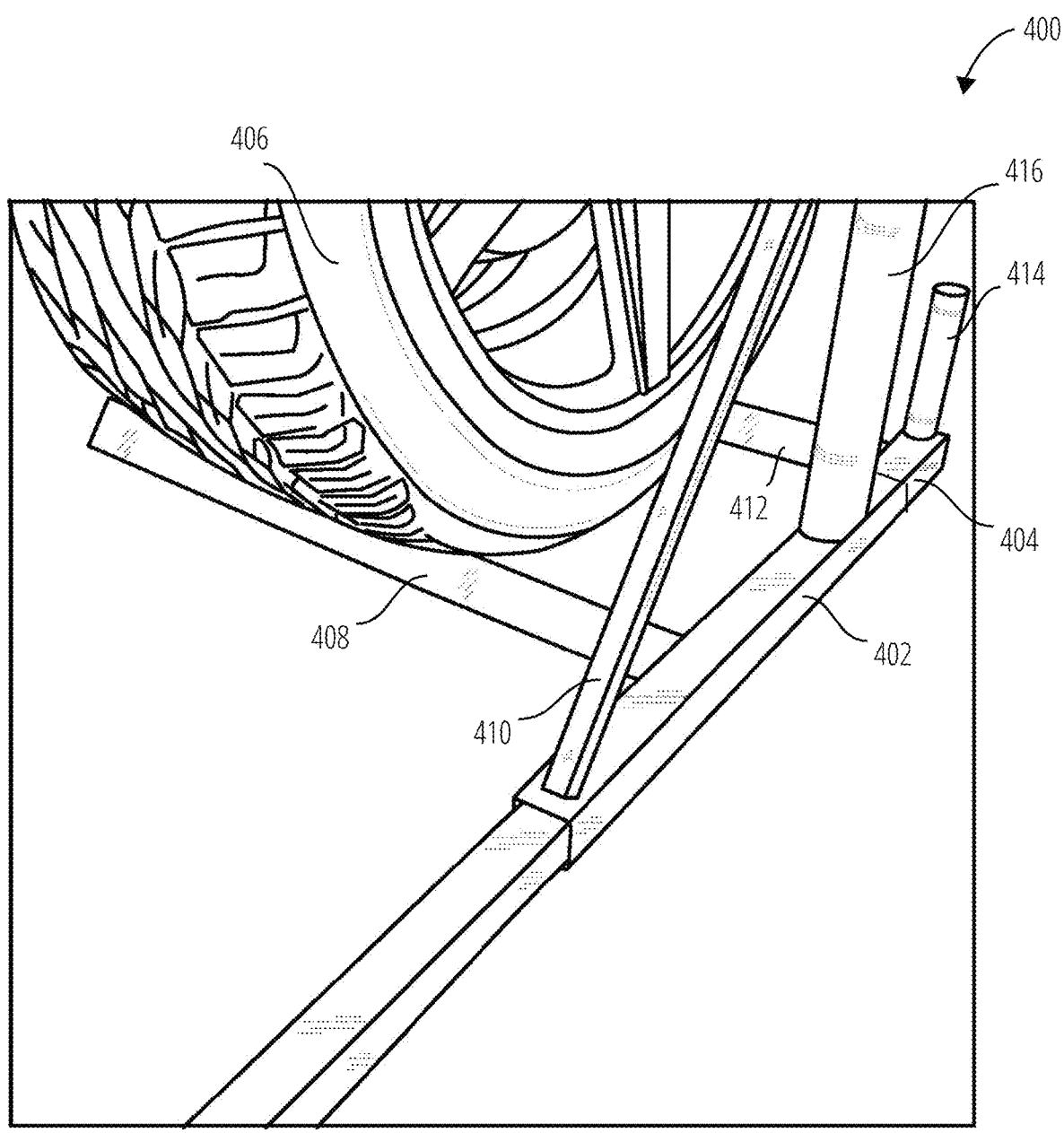
FIG. 4 illustrates an embodiment of a first view of a base 400 of the windshield installation apparatus 100.

Referring to FIG. 4, a base 400 embodiment of the apparatus 100 comprises a first base section 402, a second base section 404, a base extension section 408, a second base section extension 412, a first base section support 410, and a second base section handle 414. Such a base 400 is well suited to stable placement relative to a tire 406.

The first base section 402 is slideably engaged with the second base section 404. The first base section 402 may comprise one or more holes through which a locking mechanism (e.g., pin, bolt, etc.) may be inserted. The cross-section of the first base section 402 (as with other sections of the apparatus 100) may be rectangular, circular, polygonal, or some other shape. The first base section 402 has a hollow cross-section with an outer perimeter and an inner perimeter, which may be geometrically similar or dissimilar. The inner perimeter of the cross-section of the first base section 402 may be larger than the outer perimeter of the cross-section of the second base section 404. The difference is size of the inner perimeter of the cross-section of the first base section 402 and the outer perimeter of the cross-section of the second base section 404 results in a slideable coupling of the first base section 402 and the second base section 404.

The first base section 402 is attached to the base extension section 408. The attachment may be at a first angle with respect to the center-lines of the first base section 402 and the base extension section 408. The first angle may be any angle including perpendicular, which includes angles approximate to perpendicular within machine tolerance. The first base section 402 and the base extension section 408 define a plane. The first base section 402 and the base extension section 408 may be attached by non-permanent means, such as fasteners, or may be joined permanently (i.e., joints that cannot be removed or dismantled without damaging the joining components) by means such as welding. The first base section 402 is attached to at least a first end of the first base section support 410. The attachment may be at any angle with respect to the center-lines of the first base section 402 and the first base section support 410. The first base section 402 and the first base section support 410 may be attached by non-permanent or permanent means. The first base section 402 is further attached to the vertical base section 416 at a second angle by non-permanent or permanent means. The second angle may be normal to the plane defined by the first base section 402 and the base extension section 408.

The second base section 404 is slideably coupled to the first base section 402 as described above. The second base section 404 may comprise one or more holes through which a locking mechanism (e.g., pin, bolt, etc.) may be inserted.

The one or more holes of the second base section 404 may be aligned with the holes of the first base section 402, such that when the locking mechanism is utilized, the slideability of the first base section 402 with respect to the second base section 404 is reduced. The cross-section of the second base section 404 may be rectangular, circular, polygonal, or some other shape. The second base section 404 may have a hollow or solid cross-section. The second base section 404 may be of a length such that when slideably coupled to the first base section 402, a portion of the second base section 404 extends beyond the ends of the first base section 402.

The length that the second base section 404 extends beyond an end of the first base section 402 may be adjusted to alter the moment of inertia and provide stability to the apparatus. The second base section 404 is attached to the second base section extension 412. The attachment may be at any angle with respect to the center-lines of the second base section 404 and the second base section extension 412, including perpendicular, which includes angles approximate to perpendicular within machine tolerance. The second base section 404 and the second base section extension 412 may be attached by non-permanent means, such as fasteners, or may be joined permanently by means such as welding. The second base section 404 is attached to the second base section handle 414. The second base section 404 and the second base section handle 414 may be attached by non-permanent means, such as fasteners, or may be joined permanently by means such as welding.

The tire 406 may contact the base extension section 408 and the second base section extension 412. The second base section 404 may be slideably adjusted to the first base section 402 to alter the distance between the base extension section 408 and the second base section extension 412, resulting in contact by the base extension section 408 and the second base section extension 412 to the tire 406.

The base extension section 408 is attached to the first base section 402 as described above. The base extension section 408 has an L-shape, triangular, circular, polygonal, or irregular shape, with a solid or hollow cross-section. The illustrated shape may provide excellent stability without requiring the tire 406 to be moved. The base extension section 408 may have one surface, or portion of the surface, contacted to the tire 406. The surface may be formed with material to increase friction between that surface and the tire 406. The base extension section 408 may define a partially enclosed region with the second base section extension 412, with the tire 406 located within the partially enclosed region.

The first base section support 410 may attached to the first base section 402 at a first end and, as described above. The second end of the first base section support 410 may be attached to the vertical base section 416 based on the angle of attachment to the first base section 402 and the vertical base section 416. The first base section support 410 may be circular, polygonal, or some other shape.

The second base section extension 412 is attached to the second base section 404 as described above. The second base section extension 412 has an L-shape, or is triangular, circular, polygonal, or some other shape, with a solid or hollow cross-section. The second base section extension 412 may have one surface, or portion of the surface, contacted to the tire 406. The surface may be adapted to increase friction between that surface and the tire 406.

The second base section handle 414 is attached to the second base section 404 as described above. The second base section handle 414 may be circular, polygonal, or some other shape. The second base section handle 414 may be utilized by a user to slideably engage the second base section 404 to the first base section 402.

The vertical base section 416 may be attached to the first base section 402 and the first base section support 410 as described above. The vertical base section 416 may be oriented to extend from the first base section 402 normal to the plane defined by the base extension section 408 and the base extension section 408.

Figure 5:
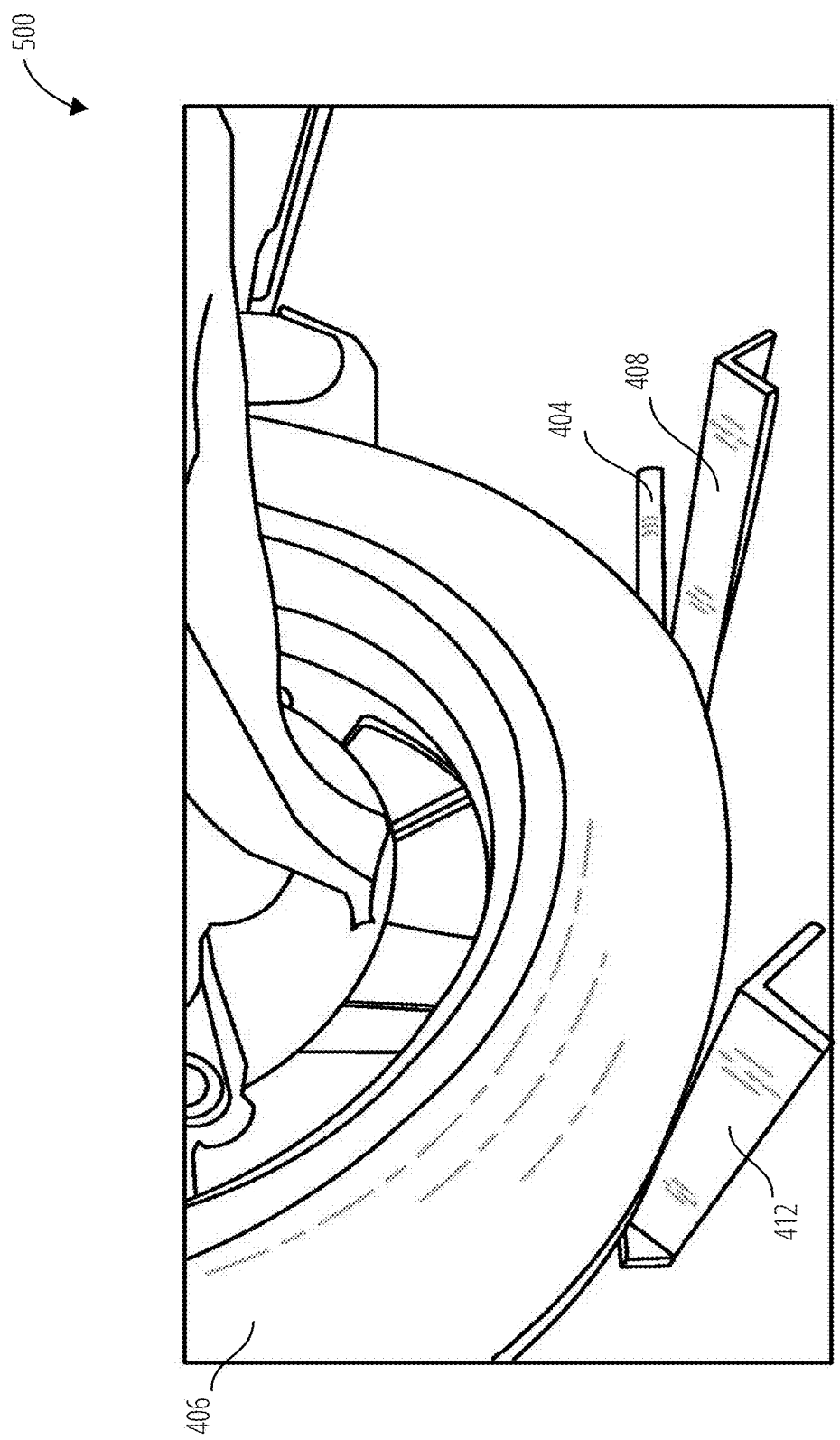
FIG. 5 illustrates an embodiment of a second view 500 of a base 400 of the windshield installation apparatus 100.

Referring to FIG. 5, the base extension section 408 and the second base section extension 412 may have a length (i.e., dimension extending the end attached to the first base section 402 (not depicted in FIG. 5) and the second base section extension 412, respectively) such that the base extension section 408 and the second base section extension 412 extend beyond the tire 406. This may provide additional stability, as well as accommodating a variety of tire widths.

As depicted in FIG. 5, the tire 406 contacts both the base extension section 408 and the second base section extension 412. As such, the tire 406 may be inhibited from rotating toward either the base extension section 408 or the second base section extension 412, which also securing the apparatus 100 firmly, without translocating the body of a vehicle to which the tire 406 is attached.

Figure 6:
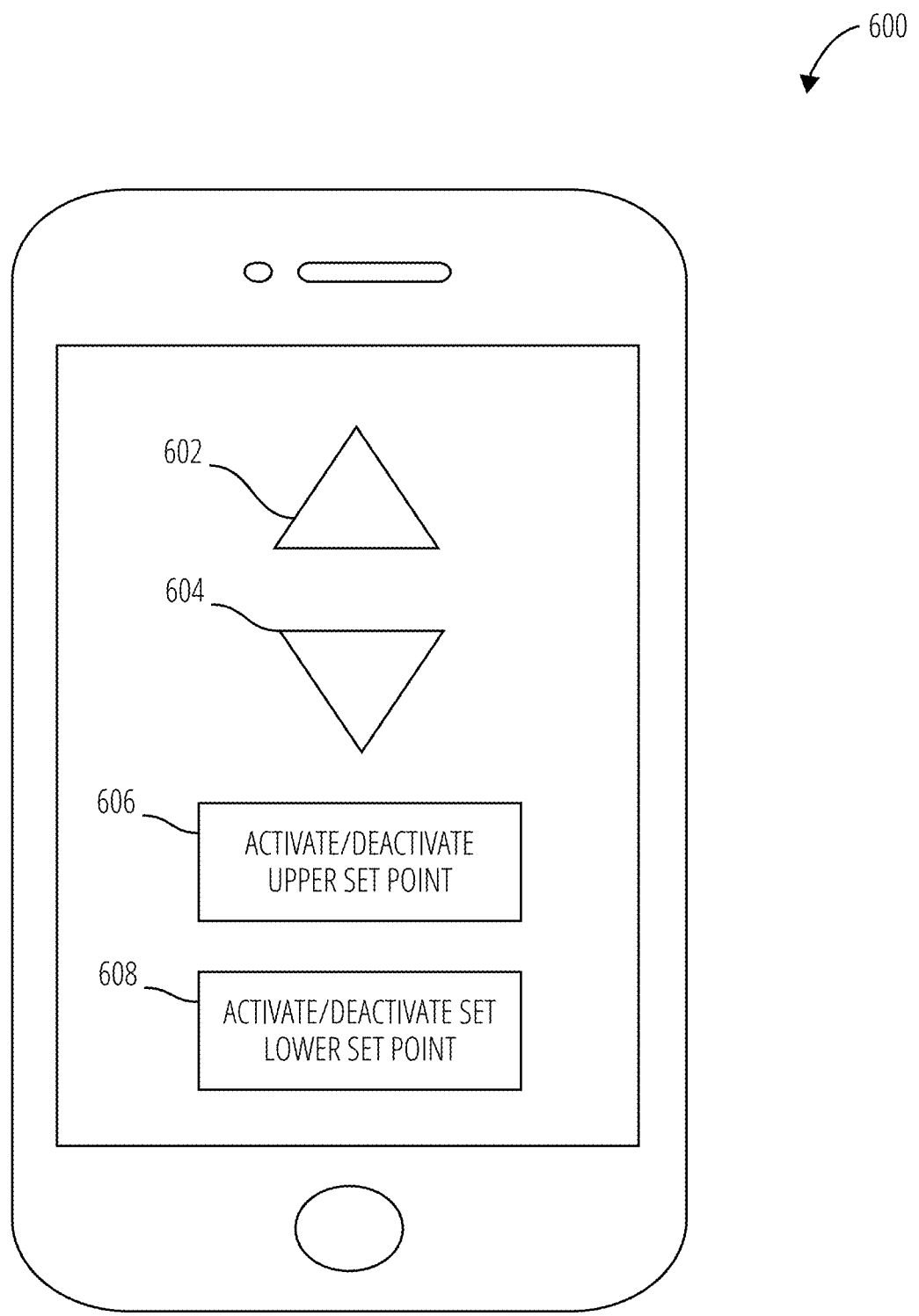
FIG. 6 illustrates an embodiment of a control device 600 for the windshield installation apparatus 100.

Referring to FIG. 6, the electrical motor control device 600 comprises a raise input control 602, a lower input control 604, an upper set point input control 606, and a lower set point input control 608.

The electrical motor control device 600 is configured to display a user interface configured to receive an input at the raise input control 602, the lower input control 604, the upper set point input control 606, and the lower set point input control 608.

The raise input control 602 is configured to receive a haptic input (for example) and, in response, send a control signal to the electrical motor control device 600 to operate the electric motor to raise the pulley system. The lower input control 604 is configured to receive a haptic input and, in response, send a control signal to the electrical motor control device 600 to operate the electric motor to lower the pulley system.

The upper set point input control 606 is configured to receive a haptic input and, in response, send a control signal to the electrical motor control device 600 to operate the electric motor to activate or deactivate the upper set point for the pulley system. The lower set point input control 608 is configured to receive a haptic input and, in response, send a control signal to the electrical motor control device 600 to operate the electric motor to activate or deactivate the lower set point for the pulley system.

Referring to FIG. 7, the motor operating method 700 receives an input at a user interface of an electrical motor control device (block 702). The input is converted into a signal (block 704). The signal may comprise instructions to operate an electric motor coupled to an electrical motor control device. The signal is received and applied (block 706) to cause the electric motor to utilize the electrical power source. The electric motor is operated per the instructions received (block 708). The electric motor may operate to raise or lower an object, such as a windshield. The instruction may also operate the electric motor to not operate beyond a defined set point (e.g., raise no higher or lower no lower).

Referring to FIG. 8, a method 800 for operating a windshield installation system begins with the receipt of set point instructions (block 802). The set point instructions may be received from the electrical motor control device or may be logic pre-loaded on the electric motor. The set point instructions may be determined for both an upper limit and a lower limit, upper and lower referring to the position of a pulley system attachment device coupled to the pulley system of the apparatus. Instructions are then received to operate the electric motor (block 804). The instructions may be received from the electrical motor control device. The instructions may operate the electric motor via the apparatus to raise or lower a windshield or other object. The operating process 800 then determines whether a set point has been reached (decision block 806). The electric motor may determine an upper or lower limit via a number of rotations from the set point(s). If the electric motor is at a set point, the operation of the electric motor is discontinued (block 808). The electric motor may continue operating if another set of instructions are received to either operate in a direction away from the set point or the set point is altered (including setting no set point for that direction). If the electric motor is not at a set point, the electric motor is operated per the instructions received (block 810). Operation continues until a set point is reached or instructions to continue operation from the electrical motor control device are no longer received.

Figure 9:
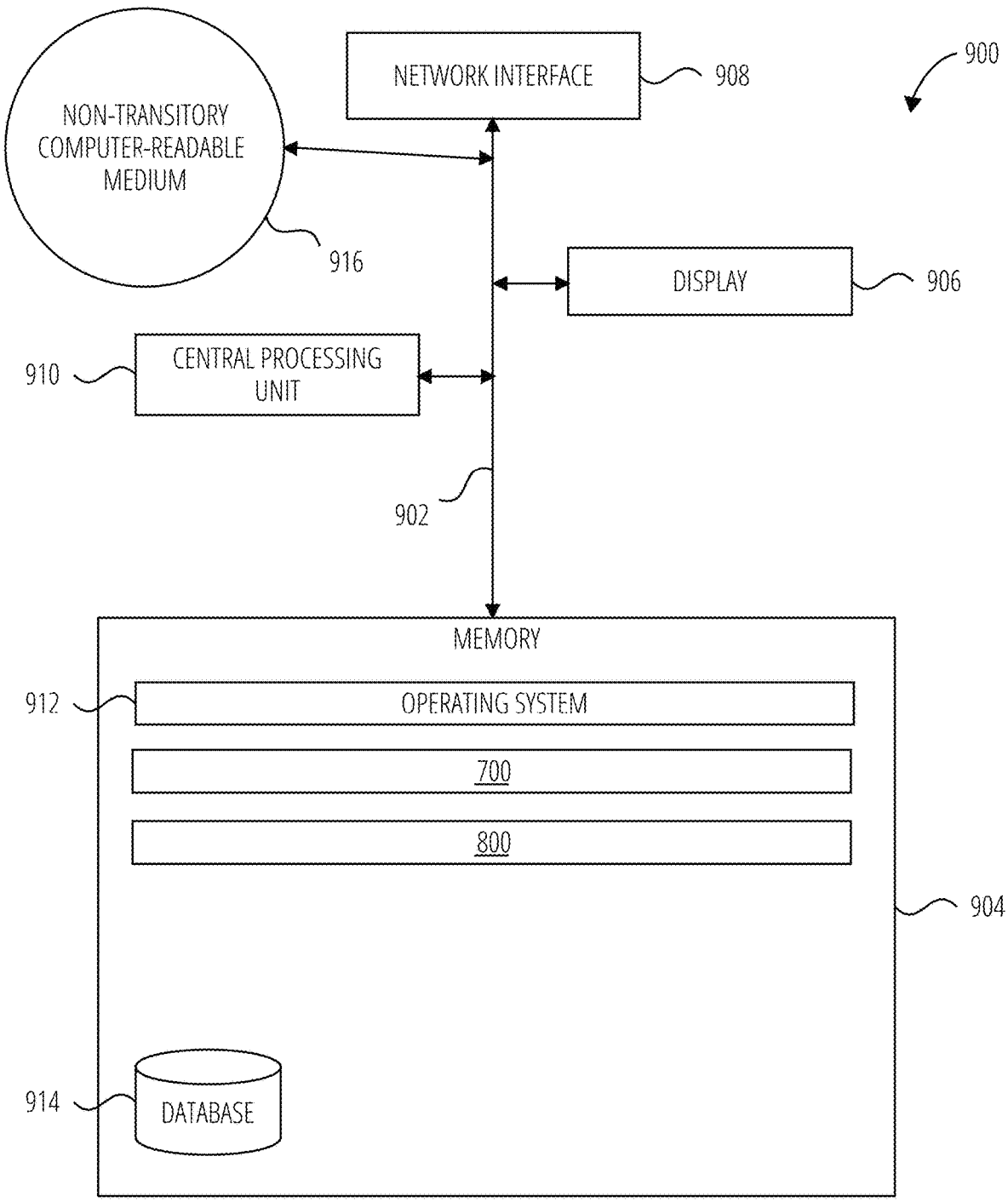
FIG. 9 illustrates a system 900 in accordance with one embodiment of a control device 600.

FIG. 9 illustrates several components of an exemplary system 900 in accordance with one embodiment. In various embodiments, system 900 may include a mobile phone, laptop, tablet, remote control, or other computing device that is capable of performing operations such as those described herein. In some embodiments, system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 900 may comprise one or more physical and/or logical devices that collectively provide the functionalities described herein. In some embodiments, system 900 may comprise one or more replicated and/or distributed physical or logical devices.

System 900 includes a bus 902 interconnecting several components including a network interface 908, a display 906, a central processing unit 910, and a memory 904.

Memory 904 generally comprises a random access memory ("RAM") and permanent non-transitory mass storage device, such as a hard disk drive or solid-state drive. Memory 904 stores an operating system 912.

These and other software components may be loaded into memory 904 of system 900 using a drive mechanism (not shown) associated with a non-transitory computer-readable medium 916, such as a DVD/CD-ROM drive, memory card, network download, or the like.

Memory 904 also includes database 914. In some embodiments, system 900 may communicate with database 914 via network interface 908, a storage area network ("SAN"), a high-speed serial bus, and/or via the other suitable communication technology.

In some embodiments, system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like. For example, in some embodiments, database 914 may comprise one or more storage resources provisioned from a "cloud storage" provider, for example, Amazon Simple Storage Service ("Amazon S3"), Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"Alternating current electrical power source" in this context refers to an electric power source that utilizes an electric current that reverses its direction many times a second at regular intervals.

"Cable" in this context refers to a thick rope of wire or nonmetallic fiber, typically used for construction, mooring ships, towing vehicles, and other load-bearing operations.

"Direct current electrical power source" in this context refers to an electric power source that utilizes an electric current that flows in one direction only.

"Electric motor" in this context refers to a device that converts electrical energy into mechanical energy.

"Electrical motor control device" in this context refers to a device configured to transmit electronic signals in response to an input.

"Electrical power source" in this context refers to an electronic device that supplies electric energy to an electrical load.

"Force directing devices" in this context refers to devices which contact a load bearing component, such as a cable, that via the contact alter the direction of the force of the load and the component itself. The device may be circular in shape, such as a pulley.

"Handle" in this context refers to is a part of, or attachment to, an object that can be moved or used by hand.

"Horizontal" in this context refers to a direction that is parallel to the horizontal plane.

"Plane" in this context refers to a traverse plane defined by two structures at an angle to each other.

"Inner perimeter" in this context refers to, in a hollow structure, such as a circular or polygonal tube, the perimeter of the cross-section of the tube with the lesser value.

"Outer perimeter" in this context refers to, in a hollow structure, such as a circular or polygonal tube, the perimeter of the cross-section of the tube with the greater value.

"Partially enclosed region" in this context refers to a region surrounded on all sides but at least one, e.g, two lines may define a partially enclosed region via additional lines drawn between the endpoints of the lines.

"Pulley system" in this context refers to a system of cables and force-directing device utilize to direct a load force onto another component, such as a motor.

"Sleeve" in this context refers to a tube into which another tube is inserted.

"Suction cup" in this context refers to is an object that uses the negative fluid pressure of air or water to adhere to nonporous surfaces, creating a partial vacuum.

"Vertical" in this context refers to a direction normal to the horizontal plane.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

The above description is given by way of example, and not limitation. Given the above disclosure, one skilled in the art could devise variations that are within the scope and spirit of the invention disclosed herein, including eliminating the pulley system and directly coupling the one or more attachment devices to the electric motor. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus comprising:
a base, the base comprising:
  a first base section;
  a second base section, the second base section slidably coupled within, and extending outward from, the first base section;
  wherein the second base section extends through the first base section;
  the first base section being coupled within a base extension section extending at a first angle and defining a plane with the first base section, and the second base section being coupled with a second base section extension, each of the base extension section and the second base section extension having a cross section formed to engage against the at least partially under a vehicle tire;
  a second base section handle attached to the second base section, the second base section handle extending outward and upward from the second base section;
  a vertical base section, the vertical base section attached to the first base section at a second angle;
a motor support structure, the motor support structure comprising:
  a vertical motor support structure, the vertical motor support structure coupled to the vertical base section;
  a horizontal motor support structure, the horizontal motor support structure coupled to the vertical motor support structure at a third angle, the horizontal motor support structure parallel to the plane;
an electric motor coupled to the motor support structure;
a pulley system, the pulley system attached to the electric motor;
one or more attachment devices, wherein at least one of the one or more attachment devices is coupled to the pulley system; and
an electrical motor control device, the electrical motor control device configured to operate the electric motor.

2. The apparatus of claim 1, wherein the first angle and the second angle are 90 degrees.

3. The apparatus of claim 1, wherein the first base section comprises an inner perimeter, and the second base section comprises an outer perimeter, the outer perimeter of the second base section slideably engaging the inner perimeter of the first base section.

4. The apparatus of claim 1, wherein the vertical motor support structure is rotatably coupled to the vertical base section.

5. The apparatus of claim 4, wherein the vertical base section further comprises a sleeve, the vertical motor support structure rotatably coupled by the sleeve.

6. The apparatus of claim 1, wherein the electric motor is coupled to the vertical motor support structure.

7. The apparatus of claim 1, wherein the electric motor is coupled to the horizontal motor support structure.

8. The apparatus of claim 1 further comprising a horizontal motor support structure extension, the horizontal motor support structure extension slideably engaged to the horizontal motor support structure.

9. The apparatus of claim 1, wherein the vertical motor support structure comprises one or more vertical attachments, each of the one or more vertical attachments configured to be coupled to the vertical base section and the horizontal motor support structure.

10. The apparatus of claim 1, wherein the electric motor is configured to utilize a direct current electrical power source.

11. The apparatus of claim 1, wherein the electric motor is configured to utilize an alternating current electrical power source.

12. The apparatus of claim 1, wherein the pulley system comprises a cable and one or more force directing devices, the one or more force directing devices coupled to the motor support structure.

13. The apparatus of claim 1, wherein the electrical motor control device is integrated into at least one of the one or more attachment devices.

14. The apparatus of claim 13, wherein the one or more attachment devices comprise a suction cup.

* * * * *